United States Patent [19]

Juenger et al.

[11] Patent Number: 5,778,106
[45] Date of Patent: Jul. 7, 1998

[54] ELECTRONIC CAMERA WITH REDUCED COLOR ARTIFACTS

[75] Inventors: Andrew K. Juenger, Hudson; Werner Metz, Stoughton, both of Mass.

[73] Assignee: Polaroid Corporation, Cambridge, Mass.

[21] Appl. No.: 615,899

[22] Filed: Mar. 14, 1996

[51] Int. Cl.$^6$ ........................................... G06K 9/00
[52] U.S. Cl. ........................................ 382/275; 382/167
[58] Field of Search ........................ 382/162, 163, 382/167, 254, 255, 256, 260, 269, 270, 274, 275, 276, 300, 309, 310, 311, 165, 190, 192, 201, 261, 263, 264, 266, 267, 268, 277, 293, 298, 299, 307, 308, 312; 358/296, 527, 502, 448, 520, 534; 348/392; 355/20; 345/501

[56] References Cited

U.S. PATENT DOCUMENTS

| | | |
|---|---|---|
| 4,432,009 | 2/1984 | Reitmeier et al. ........................ 358/22 |
| 4,462,024 | 7/1984 | Strolle ....................................... 340/727 |
| 5,040,064 | 8/1991 | Cok .......................................... 358/163 |
| 5,121,217 | 6/1992 | Schear ...................................... 358/296 |
| 5,333,243 | 7/1994 | Best et al. ................................ 395/109 |
| 5,377,024 | 12/1994 | Dillinger ................................... 358/502 |
| 5,394,523 | 2/1995 | Harris ........................................ 395/162 |

*Primary Examiner*—Leo H. Boudreau
*Assistant Examiner*—Bijan Tadayon
*Attorney, Agent, or Firm*—Christopher P. Ricci

[57] ABSTRACT

A method and apparatus for processing an image captured by an image acquisition device having a two-dimensional matrix of non-square pixels with a first aspect ratio. In one aspect of the method, the image is sampled in a color sub-sampled manner such that fewer than three color measurements are known for each pixel location. A processed image is then constructed by processing the fewer than three color measurements known for each pixel to generate one or more interpolated color values at each of the pixel locations. A processed image is then created for rendering on an output device having a square raster with a second aspect ratio which differs from the first aspect ratio. The processed image is processed such that an aspect ratio of the original image captured on the non-square pixels is maintained on the output device.

12 Claims, 8 Drawing Sheets

FIG. 6A

FIG. 6B

ELECTRONIC CAMERA WITH REDUCED COLOR ARTIFACTS

BACKGROUND OF THE INVENTION

The present invention relates generally to an apparatus and method for sampling and interpolating image data. More particularly, the invention relates to an apparatus and method for sensing color sub-sampled image data and thereafter interpolating for non-color-sub-sampled image data that substantially reduces color fringing, preserves detail, and substantially maintains balance of sharpness in each of two orthogonal sampling directions while allowing selection of the overall quantity of image data.

Electronic imaging cameras for recording still images are well known in the art. Such cameras can record a plurality of still images on a single magnetic disk or tape in either analog or digital format for subsequent playback on an output device, such as any well-known cathode ray tube viewing device for example. Printers may also be utilized with such cameras in a well-known manner to provide hard copies of the recorded images.

Such electronic imaging still cameras often utilize two-dimensional image sensing arrays such as charge coupled devices ("CCD"s) which integrate incident scene light over a predetermined time to provide an electronic information signal corresponding to the scene light intensity incident on the array. Such two-dimensional image sensing arrays comprise a predetermined number of discrete image sensing elements or pixels arranged in a two-dimensional array, in which each image sensing element responds to incident illumination to provide an electronic information signal corresponding to the intensity of the incident illumination.

In order to record color images, the incident illumination to the two dimensional image sensing array is filtered so that different image sensing elements receive different colored illumination. The filters are arranged in well known patterns across the face of an image sensing array, such as a repeating pattern of red, green, and blue stripes. Alternatively, individual image sensing elements or pixels may be filtered in a repeating pattern of red, green, blue, and green filters in a two by two checkerboard, as is well known in the art.

In red, green, and blue stripe color filter array sensors the distance from one red pixel to the next red pixel is three pixels in the direction orthogonal to the direction of the stripes while the distance from one red pixel to the next red pixel is one pixel in the direction along the direction of the stripes. Therefore, the sampling frequency in red is one third of the monochrome sampling frequency of the same sensor without the color filter array in the direction orthogonal to the direction of the stripes while the sampling frequency in red is equal to the monochrome sampling frequency in the direction along the direction of the stripes. This is also true for the green and blue signals.

The continuous spatial signal must be prefiltered for anti-aliasing equally in all colors and more for the signal in the direction orthogonal to the stripes than would have been necessary for a monochrome system with the same sensor yet in the direction along the direction of the stripes the continuous signal may be prefiltered in a manner following the constraints of the monochrome case.

It is well known in the art that to prefilter an optical signal in an anisotropic manner an optical element with the property of different blur characteristics in each of several directions may be inserted in the optical path. Birefringent materials such as quartz plates have been used successfully for this purpose in the art. Birefringent materials such as quartz plates can be made to have the property of minimal blur in one direction and a two spot blur in the orthongonal direction with the distance between the spots related to the thickness of the plate and the difference in the indices of refraction between the ordinary and the extraordinary directions of polarization. The two spot blur describes the fact that a continuous spatial optical signal is split, half is shifted in one direction by a predictable distance, and superimposed on the other half of the original optical signal. Thus the image of a single spot in a scene would contain two spots separated by a known distance.

In the case of three color striped filter arrays the thickness of the quartz is set such that the distance of the shift of the superimposed image is one half the distance of a color triad. Thus, the image is replicated and shifted by one and one half pixels effectively canceling any frequency content in the continuous optical signal at the triad frequency and attenuating frequency content in the optical signal near the triad frequency while substantially transmitting frequency content in the signal away from the triad frequency. This reduces the probability and magnitude of a particularly objectionable color subsampling artifact, i.e., periodic lightness fluctuations in the image of the scene at frequencies near the triad frequency aliased by color subsampling as lower frequency color modulation. The one dimensional optical anti-aliasing prefiltration described above necessarily reduces the frequency response of the electronic still camera in the direction orthogonal to the direction of the color stripes and as a consequence the sharpness of the system is reduced in that direction. The pixels on a CCD are generally square in shape. With three color striped color filter arrays and two spot optical anti-aliasing filters on CCDs with square pixels the frequency responses in the striped and orthogonal directions are imbalanced. Furthermore, since each image sensing element can only detect one color of illumination, the color information for the other colors not detected by that image sensing element must be filled in. Filling in the missing color information is generally accomplished by interpolating the detected image data for each color to determine color values for all the colors for each image sensing element.

While two spot anti-aliasing with striped color filters minimizes color aliasing from periodic lightness fluctuations, it does not minimize color fringing artifacts from a periodic lightness structure in scenes such as sharp edges. Conventional types of interpolation can provide images with objectionable color fringing artifacts near sharp edges. The conventional approach to solve this problem is to prevent the color fringes at the expense of image sharpness by blurring the image before sampling beyond the amount necessary to mitigate monochrome and periodic color aliasing. Additionally, in conventional missing color interpolation methods the scene detail at each pixel is reconstructed from some weighted contribution of each of the colors at each pixel location, that is, from contributions of a single original color sample and from two interpolated color samples. Since the process of interpolation is a neighborhood process, the interpolated color values carry spatial information from the pixels from which they were interpolated. This is effectively a blur function which is carried into the detail of the reconstructed image.

In commonly assigned U.S. Pat. Nos. 4,663,655, issued May 5, 1987, 4,774,565, issued Sep. 27, 1988, and 4,724,395, issued Feb. 8, 1988, all to William T. Freeman, which are each incorporated herein by reference, there is described an improved technique which eliminates color fringing artifacts due to sharp edge transitions in scenes without requiring additional optical anti-aliasing prefiltration. The effect of this improved technique for missing color interpolation is to provide image detail in the reproduction of the scene entirely from the original colored pixels at each pixel location regardless of the color of the sampling pixel. There is no additional blur due to missing color interpolation.

As a consequence of the effect of the improved technique for missing color interpolation the frequency response of the electronic still camera can be described by the geometry of the elements of the system without regard to the color of the sampling pixels. With the ability to describe the frequency response of an electronic still camera by the geometry of the optical elements and the ability to prevent and suppress color subsampling artifacts it is desirable to produce a CCD and from it an electronic still camera that produces images with reduced color artifacts and improved sharpness which is balanced in the striped and orthogonal directions.

Therefore, it is an object of this invention to provide an image sensor and an associated electronic imaging camera which samples color image data in a manner that substantially prevents color aliasing while preserving sharpness.

It is another object of this invention to provide an electronic imaging camera which interpolates sampled color image data in a manner that substantially reduces color fringing.

It is still another object of this invention to provide an electronic imaging camera in which sampled image data is interpolated to provide image data in all the colors for all the image sensing elements while minimizing color artifacts and preserving sharpness.

It is still another object of this invention to provide an electronic imaging camera in which sampled image data is interpolated to provide image data in all the colors for all the image sensing elements while carrying lightness detail only from the originally sampled color value at each pixel location regardless of the original color.

It is still another object of this invention to provide an image sensor and an associated electronic imaging camera in which the sharpness of the reconstructed image is matched in the two orthogonal sampling directions.

It is a further object of this invention to provide an image sensor and an associated electronic imaging camera in which the sharpness of the reconstructed image is matched in the two orthogonal sampling directions in each of two resolution modes.

These and other objects of the invention will be obvious and will appear hereinafter.

SUMMARY

The aforementioned and other objects are achieved by the invention which provides an image sensor, an electronic still camera, and a method associated therewith for image processing to form a processed image with reduced color artifacts, where an image is represented by a plurality of image signals in three colors. The method is useful with an electronic still camera, and comprises the steps of sampling the image of a scene in a color sub-sampled manner then constructing an improved full color image of the scene by processing the color sub-sampled pixel values.

The invention includes optimization of the pixel geometry for capability of balanced sharpness in each of two orthogonal sampling directions in the context of striped color filter arrays and dual resolution reconstruction.

For example, many CCD's, as previously described, use colored stripes mechanically attached to the CCD to filter colors, thereby making individual pixels associated with only one color. These individual pixels are broken into color planes. Therefore, if colored stripes of red, green, and blue ("RGB") are attached to the CCD, then the pixels associated with each individual color are broken into a red color plane, a green color plane, and a blue color plane.

Since these colors have now been separated, voids now exist where the previous colors used to be. That is, in the red color plane, the pixel locations where green and blue had to have existed previously are now left void. Therefore, the next step is to interject interpolated image signals in each of the color planes that correspond to the image signal locations left void by the separation step. This now forms a triplet for each color location in the image. Previously, a single pixel location would contain only information on one color, red for example. Now, with the interpolated data, each pixel location has RGB information associated therewith.

Next, two difference signals are created at each pixel location that represent the differences between one channel and a second, and the first channel and the third within the RGB triplet. In the previous example using RGB, those difference signals can be any combination of the R, the G, or the B, as long as from those three colors, two different difference signals are created. In the preferred embodiment, R-G and B-G are used.

The difference signals are then filtered using a median filter which substantially reduces or removes color artifacts.

Next, the image is reconstructed from the original image signals and the filtered difference signals to form a processed image which has substantially preserved detail and reduced color artifacts. The improved RGB triplets thus formed from linearly interpolated RGB triplets have the same pixel geometry as the original single color pixels. In the case of rectangular pixel geometry, some method of producing pixels of square geometry must be employed for use with any display device that renders images on a raster of square geometry.

In the case of rectangular pixels of aspect ratio height twice the width, the invention provides dual resolution modes for easily producing square pixels for display. In one resolution mode, neighboring pairs of pixels are averaged in the direction normal to the major axis of the rectangular pixels within each color plane such that one half as many square pixel RGB triplets are formed as there were original single color rectangular pixels, while in the second resolution mode new RGB triplets are interjected by interpolation in the direction parallel to the major axis of the rectangular pixels such that twice as many square pixel RGB triplets are formed as there were original single color rectangular pixels. In the case of rectangular pixels of aspect ratio other than height twice width, multi resolution mode can be supported with more complicated down sampling and up sampling schemes.

The improved color reconstruction method preserves image detail by injecting abrupt lightness transitions sensed by any original pixel regardless of color into the reconstructed missing color pixel values. This property reduces the blur associated with color sub-sampling to that blur associated with the geometry of the optical elements in the electronic still camera and the blur associated with forming square pixels from rectangular pixels. In the invention, the pixel geometry is optimized for balanced sharpness in each sampling direction given the associated blur functions of the other optical elements and the image processing by analysis of the frequency response of the system and quantification of sharpness by a figure of merit which considers the frequency response properties of the human visual system.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which:

FIGS. 6A, 6B, and 6C show the pixel values reconstructed after median filtration of the color difference signals, the pixel values after averaging in the direction normal to the major axis of the rectangular pixels, and the pixel values after interpolation along the major axis of the rectangular pixels respectively;

DETAILED DESCRIPTION

While the present invention retains utility within a wide variety of photographic devices, such as video cameras for example, and may be embodied in several different forms, it is advantageously employed in connection with an electronic still camera. Though this is the form of the preferred embodiment and will be described as such, this embodiment should be considered illustrative and not restrictive.

As previously discussed, electronic imaging cameras conventionally record color images by using an image sensing array comprising a predetermined number of discrete image sensing elements or pixels arranged in a two-dimensional array in which the image sensing elements respond to incident illumination to provide an electronic information signal corresponding to the intensity of the incident illumination. Such image sensing arrays may be charge coupled devices ("CCD") of the frame transfer type. It is well known to sense color images using a single two-dimensional CCD array by filtering the illumination incident to the image sensing array so that different groups of the image sensing elements arranged in well-known patterns across the image sensing array receive different wavelengths for colored illumination. Thus, each color of illumination is sampled by each group of image sensing elements, and thereafter interpolated to provide color values corresponding to the other groups of image sensing elements. The full color image is therefore estimated or interpolated between the different groups of image sensing elements or pixels to fill in all colors for each image sensing element or pixel.

Conventional types of interpolation provide images with objectionable aliasing artifacts such as color fringes near sharp edges. An example of how a sharp edge in a sample to be recorded can create color fringes, when the image of the subject is reconstructed using conventional interpolation methods, will be discussed herein.

Figure 1A:
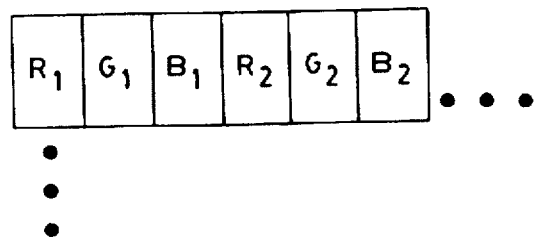
FIGS. 1A and 1B show pixel locations as found on a CCD, and a representative example, respectively.

As previously described, a typical CCD arrangement includes color filter stripes thereon such that individual stripes of pixels measure an intensity of light for only a single color. FIG. 1A shows a typical arrangement of a CCD using color stripes, where individual pixels are marked by R, G, or B representing red, green, and blue colors. Numerical designations associated with the color, i.e., $R_1$, $G_1$, and $B_1$, together are referred to a triplet.

Figure 1B:
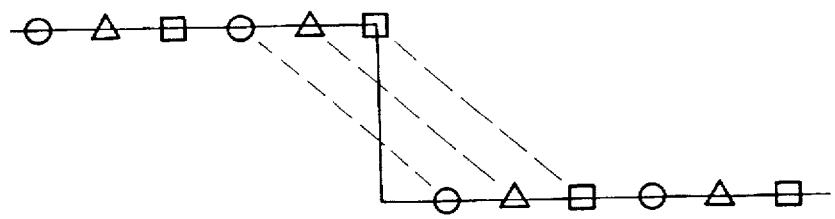

In order to illustrate the invention, an example is shown for each step. The example is of an image having a sharp contrast such as a sharp white-to-black transition. The example begins in FIG. 1B where a light intensity level is shown graphically for a white-to-black transition in an image. Keys to FIG. 1B is as follows: the solid line represents the edge transition in the original continuous image of the scene before sampling, the circle represents an original red sample, the triangle represents an original green sample, and the square represents an original blue sample. It can be seen from the illustration that for the original continuous image the falloff during the transition is substantially vertical. This indicates a sharp transition. A slope in the falloff would be indicative of a more gradual, or less sharp, transition.

Figure 2A:
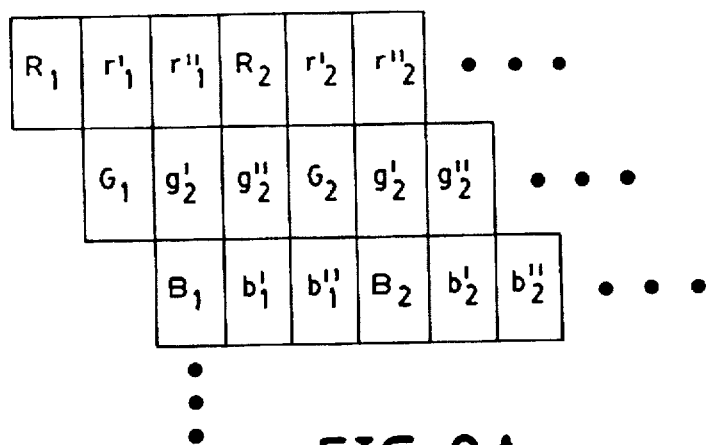
FIGS. 2A and 2B show the pixel locations and the example of FIGS. 1A and 1B, respectively, after linear interpolation is performed.

FIG. 2A again shows a pixel layout of the pixels of 1A, but now the pixels have gone through the step of interpolation. In the preferred embodiment, this is a linear interpolation, as will be later hereinafter described. The convention used is that a capital letter represents original raw data and a lower case represents interpolated data. Therefore, the colors interpolated between $R_1$ and $R_2$ are shown as $r_1'$ and $r_1''$. Using linear interpolation, $r_1'$ contains ⅔ of the intensity of $R_1$, and ⅓ of the intensity of $R_2$. Likewise, $r_1''$ contains ⅓ the intensity of $R_1$ and ⅔ the intensity of $R_2$. By linearly interpolating values throughout for red, green, and blue, the colors can be broken into three color planes such that there now exists triplets for each individual pixel location, where previously there only existed raw data in one color for each location.

Figure 2B:
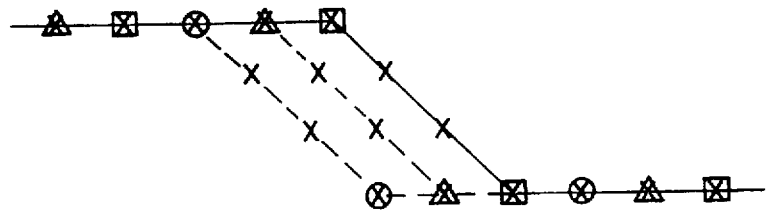

Continuing the example, FIG. 2B shows the step of linear interpolation on the white-to-black transition shown in FIG. 1B. As shown in FIG. 1B, the lines indicate paths of the linear interpolation where the circles, triangles, and squares represent original red, green, and blue samples and the x's represent interpolated values. FIG. 2B illustrates how the interpolation tends to blur the sharp transition previously seen in the image by interpolating where the dashed line represents red, the dotted line represents green, and the solid line represents blue. The slope of the line is indicative of a less sharp transition, thus blurring the image. FIG. 2B also illustrates how the interpolation tends to create color fringe artifacts. In the original white-to-black transition the red, green, and blue intensity transitioned at the same spatial location while it can be seen in FIG. 2B that the red signal after interpolation initiates transition before the green which initiates transition before the blue. An image reconstructed from the data represented in FIG. 2B would show a pronounced white-to-cyan-to-purple-to-blue-to-black color fringe.

A next step is to create two difference signals at each location. The color fringe artifact at a white-to-black transition in the scene produced by interpolation within color planes would appear as a sudden rise in a color difference signal followed by a corresponding sudden fall or as a sudden fall followed by a sudden rise. It is this rapid increase and decrease in the difference between the colors which is a characteristic of objectionable color fringing, and is not simply a sudden rise in the difference between colors, which is indicative of a change from one color to a different color. Thus, it is unlikely that a real scene would result in the creation of such a color spike, and it is not desirable to create such a color spike as a result of a method of interpolation chosen.

Figure 3:
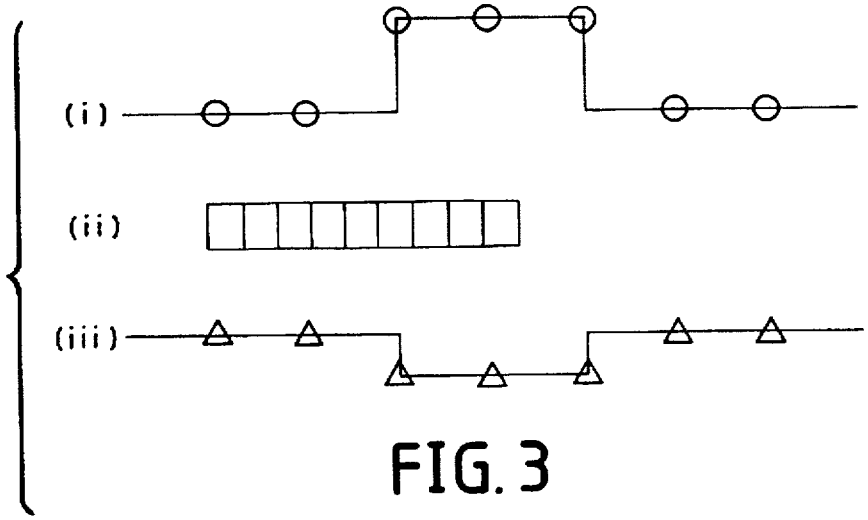
FIG. 3 shows the representative example of FIGS. 1B and 2B during performance of median filtering.

FIG. 3 illustrates the aforementioned color spikes in the color difference signals, where in the preferred embodiment, the difference signals are performed by subtracting the intensity of green from the intensity of red and subtracting the intensity of green from the intensity of blue, that is R-G and B-G. One skilled in the art will realize that the actual choice of colors that determine the difference signals is somewhat arbitrary. Consistency after the choice is made is of primary importance. Therefore, other color difference signals can be chosen without detriment to the invention.

FIG. 3(i) graphically illustrates the results of the difference signal for R-G, for the signal shown in FIG. 2B. FIG. 3(iii) graphically illustrates B-G.

Various methods can now be employed to remove the color aberration. In the preferred embodiment, a median filter is employed, such as that previously described and incorporated herein by reference. Simply stated, the median filter takes a series of pixels, such as those shown in FIG. 3(ii), and replaces the pixel value at the center of the filter region with the median value of all the pixels within the region. Though various numbers of pixels can be used, in the preferred embodiment, the median filter uses nine pixels and returns the median value of the nine pixels. Therefore, as the filter is worked horizontally across the signal, it can be seen that unless the spike is longer than one half the filter length, the spike in the signal will be essentially eliminated.

Figure 4:
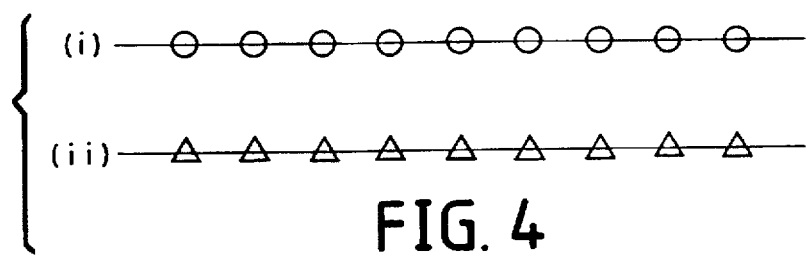
FIG. 4 shows the result of the median filter on the example of FIG. 3.

FIG. 4 illustrates the results of passing the median filter across the difference signals, where 4(i) corresponds to the R-G difference signal shown in 3(i), and 4(ii) corresponds to the B-G difference signal shown in 3(iii), where these signals can now be referred to as (R-G)' and (B-G)', respectively. The differences are now flat and the reconstructed colors will now remain substantially constant with respect to each other before, during and after the color transition. Reference is again made to FIG. 1B as an example of this.

Figure 5:
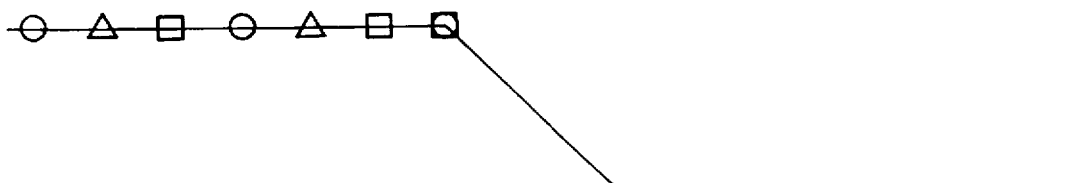
FIG. 5 shows reconstruction of pixels of the previous example.

A next step is shown in FIG. 5, where the pixels are reconstructed from original raw RGB data and filtered (R-G)' and (B-G)' difference signals. The colors are restored using the following relationships:

$R@R=R$ $R@G=G+(R-G)'$ $R@B=B-(B-G)'+(R-G)'$ $G@R=R-(R-G)'$ $G@G=G$ $G@B=B-(B-G)'$ $B@R=R-(R-G)'+(B-G)'$ $B@G=G+(B-G)'$ $B@B=B$

These relationships illustrate the properties of preserving the original sampled values and extracting detail at every pixel regardless of its original color. The detail extracting property is accomplished by removing the sudden spikes in the color difference signals which effectively produce local color samenesses, so in regions of sharp edge transitions, when the original sampled pixels values change in response to edge transitions, the reconstructed missing color values are made to follow the original values. This property injects the detail information into all three channels.

FIG. 5 illustrates the reconstruction, where now instead of having diagonal lines showing the transition between colors, illustrating loss of sharpness and color fringing, now the circle representing red, the triangle representing green, and the square representing blue at the transition points are located in a substantially identical location such that the sharpness is retained and color fringes are avoided.

Figures 6A, 6B:
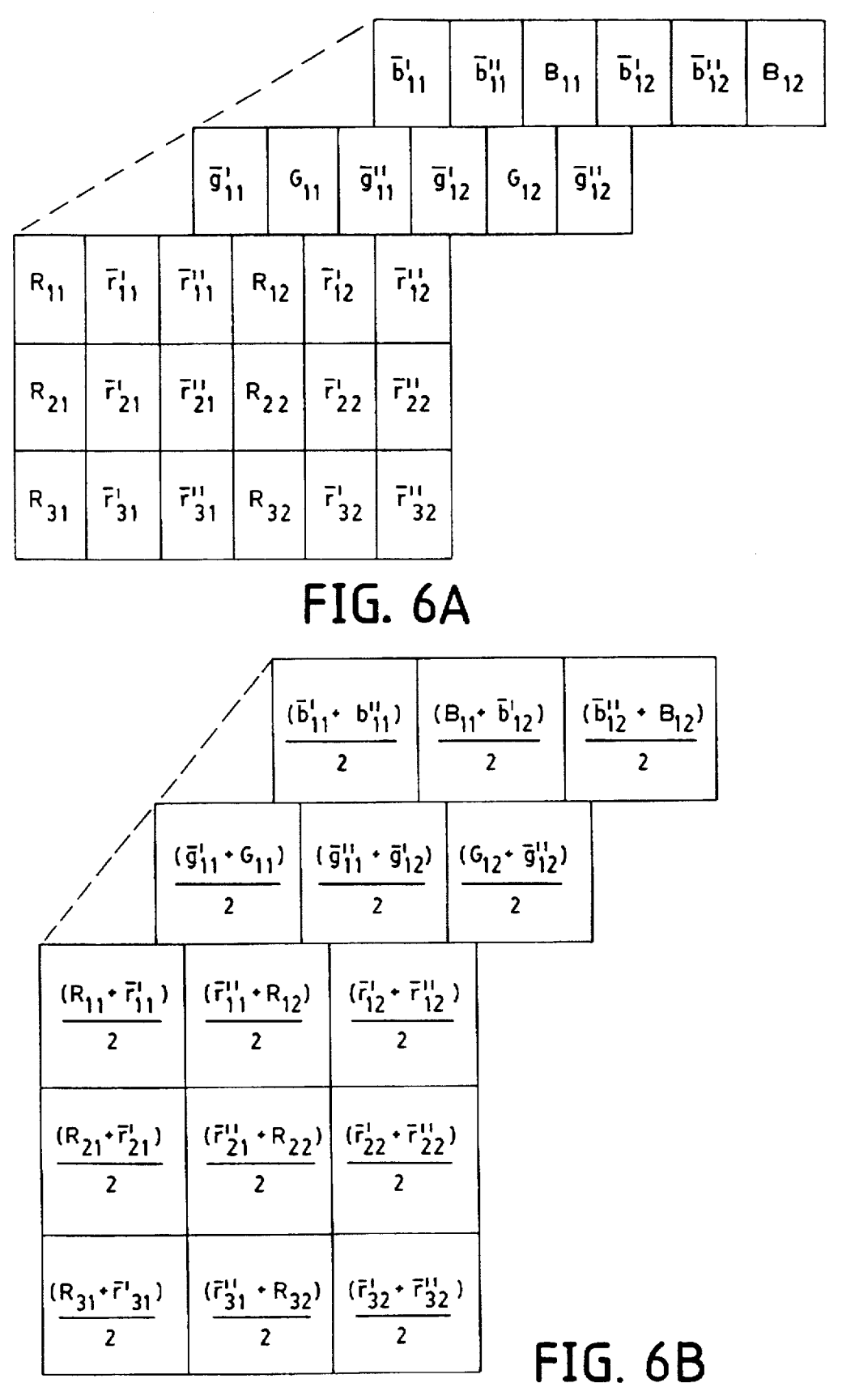

In order to display the resulting image on most commercially available cathode ray tubes (CRT) and most commercially available printers, a square pixel must now be attained. Since some CCD's, and specifically that of the preferred embodiment, has rectangular pixels, generally having a 2:1 aspect ratio, a way of solving this problem is to average two neighboring pixels, $R_1$ and $r_1'$, for example, to form a single square pixel at that location. FIG. 6A shows pixels values from an RGB striped sensor with 2:1 aspect ratio rectangular pixels after reconstruction from original sampled color values and median filtered color difference signals.

Figure 6C:
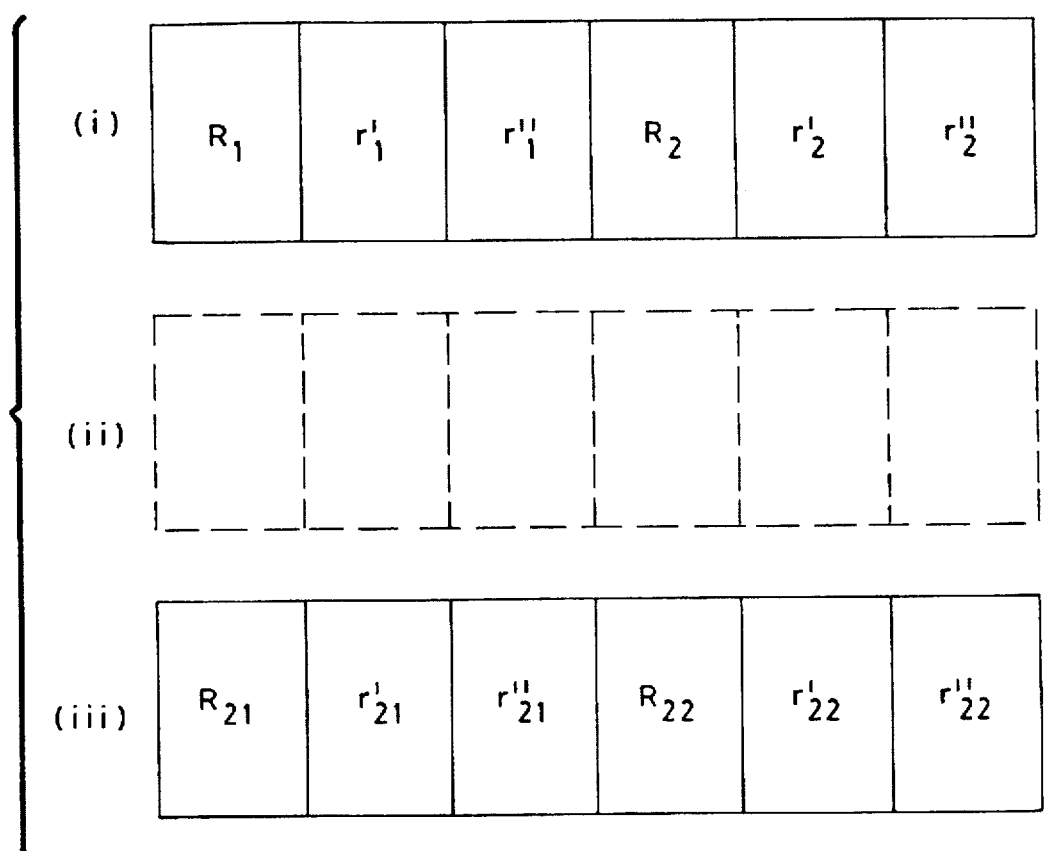

FIG. 6B shows pixel values on a square grid after averaging neighboring values. This would take an image resolution that has one million pixels, for example, and create an image that is displayable to a user having 500,000 three color pixels. An alternative method of creating square pixels is optionally used in the preferred embodiment. Rather than averaging horizontally, the pixels are interpolated vertically, as is shown in FIG. 6C.

In FIG. 6C(i), an original line of RGB data is shown, and in FIG. 6C(iii) a second line of RGB data is shown, separated by FIG. 6C(ii) which is an interpolated line of RGB data. The interpolation between these lines can be as simple as nearest neighbor interpolation, which, in essence, duplicates a previous line to create a new line. The preferred methods include linear interpolation, bi-cubic convolution interpolation, or frequency domain interpolation, such as Fourier, DCT, wavelet, et cetera.

The interpolated line (ii) creates additional pixels available for display. Thus, in the one million pixel example, two million three-color pixels would now be available. That is, if the color reconstructed image was 1600×600×3 where the three represents the three color planes, interpolation would result in 1600×1200×3 pixels being available.

In contrast to the prior art method of beginning and ending with square pixels, the method of the invention does not, per se, result in square pixels. The pixel geometry has actually not changed. The method works since output devices do not actually know the geometry of the pixels coming into the device, but instead simply displays according to an electronic signal. Therefore, rectangular pixels are displayed either separated by an interpolated line which carries color information that makes the transition between the rectangular pixels or effectively formed into squares by averaging. This serves to eliminate the distortion that would otherwise result and simulates having a square pixel geometry.

Figure 7:
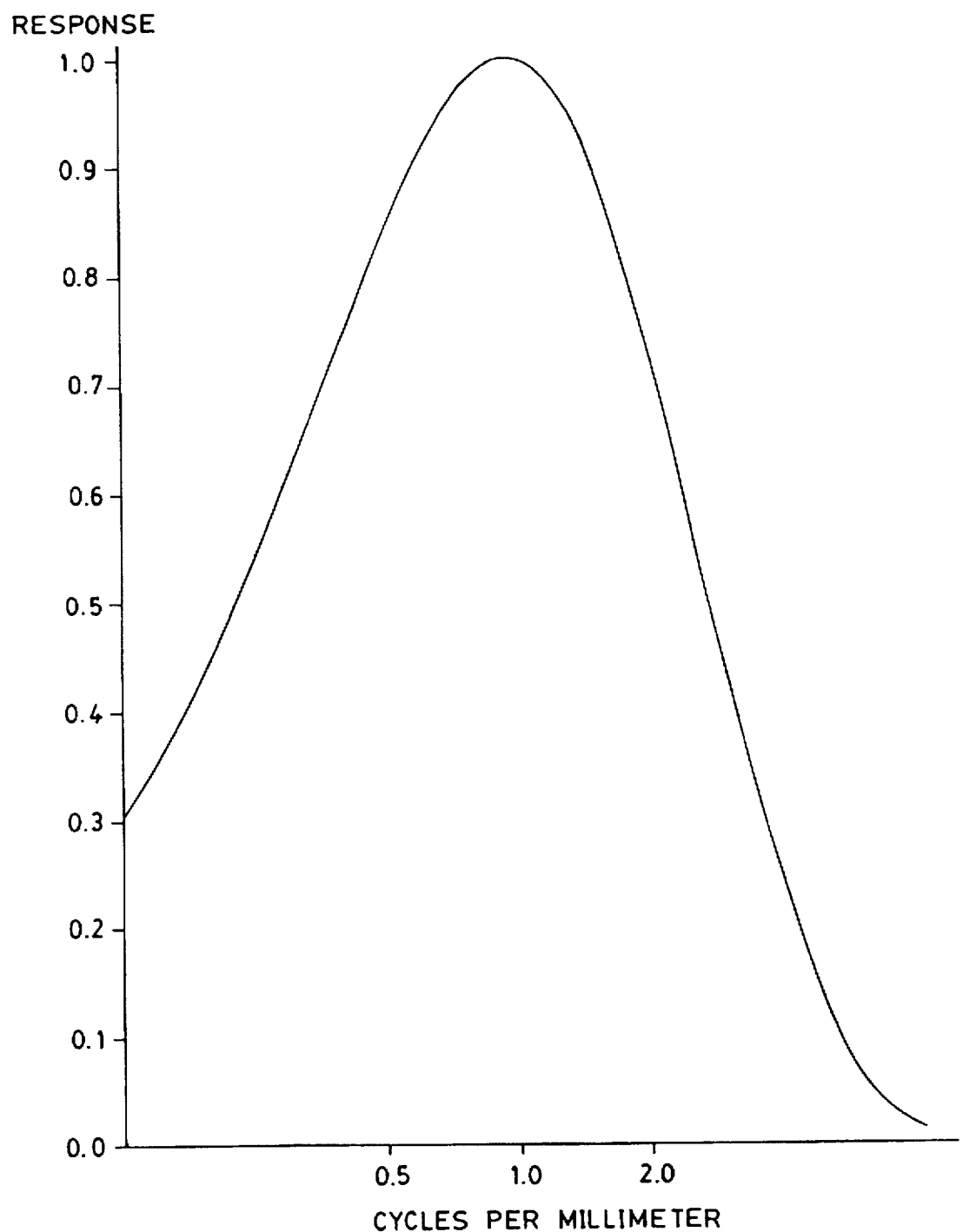
FIG. 7 shows a characterization of the frequency response of the human visual system.

FIG. 7 illustrates a characterization of the relative frequency response of the human visual system at a normal print viewing distance. This characterization has been made by psychovisual studies of subjects responses to periodic lightness gratings at various frequencies of cycles per degree of visual subtense. For use in pixel geometry optimization of a sensor for an electronic still camera, the frequencies are expressed as cycles per millimeter given a normal twelve inch print viewing distance. A characterization of the relative frequency response of the human visual system in cycles per degree of visual subtense is given by the following equation:

$$HVS(cy/°) \cong 5.05 \times e^{(-0.138 \times cy/°)} \times (1 - e^{(-0.1 \times cy/°)})$$

The relationship between cycles per degree of visual subtense and cycles per millimeter given a particular viewing distance D in inches, is given by:

$$cy/° = \pi \times (cy/mm) \times D \times 25.4/180$$

It is generally true that the spatial reproduction of the image of a scene captured by an electronic still camera involves magnification. The sensors are generally quite small relative to CRT displays or print renderings of the images captured by electronic still cameras. Characterization of the frequency response of the elements of such a system for calculation of a sharpness figure of merit which includes the response of the human visual system necessarily includes a nominal magnification factor.

Figure 8:
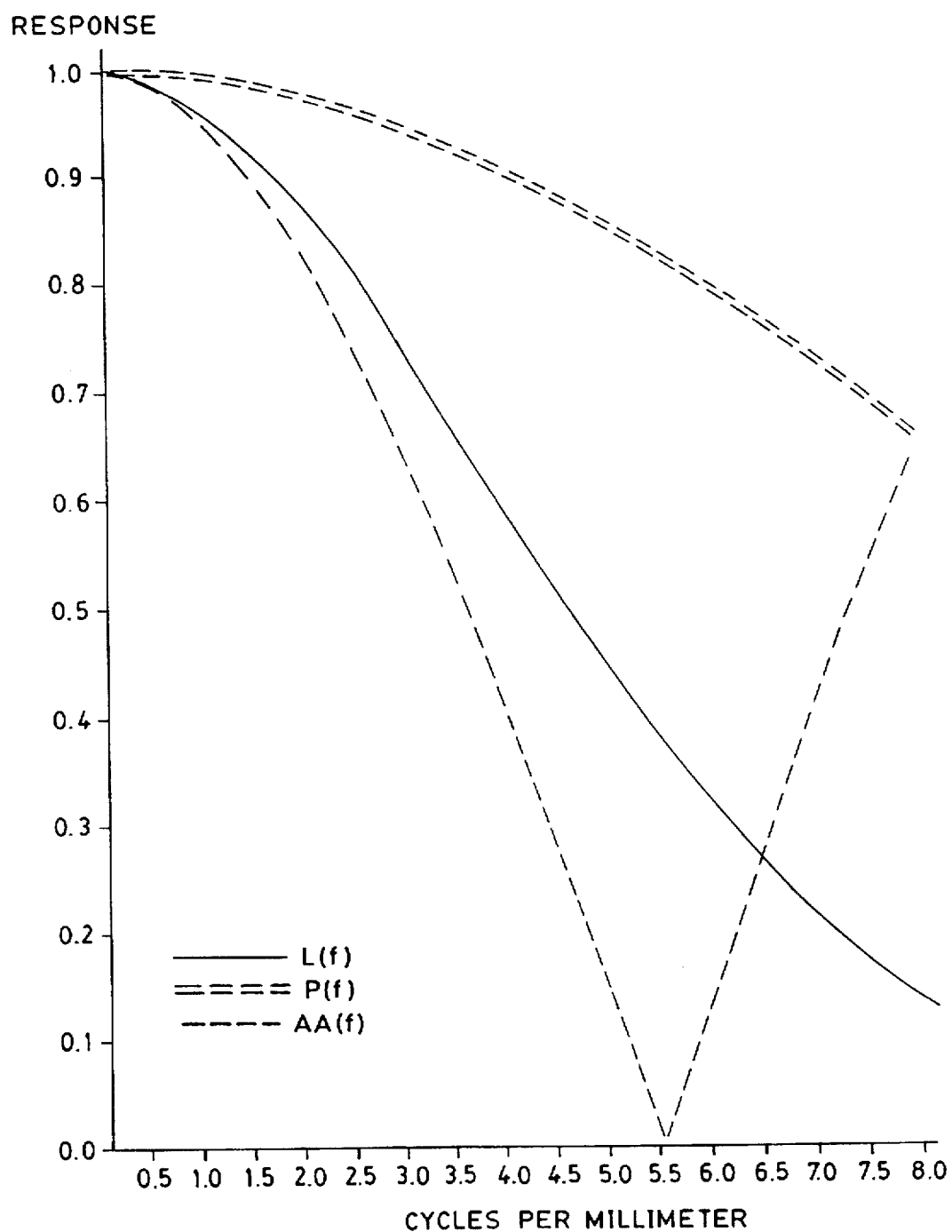
FIG. 8 shows a characterization of the frequency response of the optical elements of an electronic still camera.

FIG. 8 shows the frequency responses in print referred cycles per millimeter of a representative lens, pixel, and antialiasing filter given a representative magnification factor of ten. The representative frequency responses are given by the following equations:

$$L(f) = e^{-(\pi \times f^2 \times (M \times b)^2)}$$

$$P(f) = \frac{\sin(\pi \times f \times (M \times p))}{\pi \times f \times M \times p}$$

$$AA(f) = \cos(\pi \times f \times M \times aa)$$

Where L(f) is the lens frequency response in cycles per millimeter f, given a magnification M, and a characteristic blur distance b, at the sensor plane. P(f) is the pixel response given M and sensor pixel width p. And, AA(f) is the anti-aliasing response for M and a two spot separation distance aa at the sensor plane. In the representative example of FIG. 8; M=10, b=0.01 mm., p=0.006 mm., and aa=0.009 mm.

In the preferred embodiment, the sensor is fabricated with rectangular pixels of aspect ratio 2:1 (height:width) with striped color filters oriented along the major axis of the pixels. This design, optimized for maximal and balanced sharpness with reduced color artifacts, allows for convenient dual resolution modes. As previously described, the process of forming pixel values suitable for display on a device with a square raster involves either reducing the number of pixel values by a factor of two in the direction normal to the major axis of the rectangular pixels, hereinafter referred to as the horizontal direction, or alternatively increasing the number of pixel values by a factor of two in the direction along the direction of the major axis of the pixels hereinafter referred to as the vertical direction. While those skilled in the art will recognize that there are many techniques for resampling including convolution based and frequency based techniques, for illustrative purposes pairwise neighbor averaging horizontally and pairwise linear interpolation vertically are given as examples. Furthermore, those skilled in the art will recognize that aspect ratios other than 2:1 and corresponding resampling factors other than 2 or one half can be employed without departing from the spirit of the invention.

Figure 9:
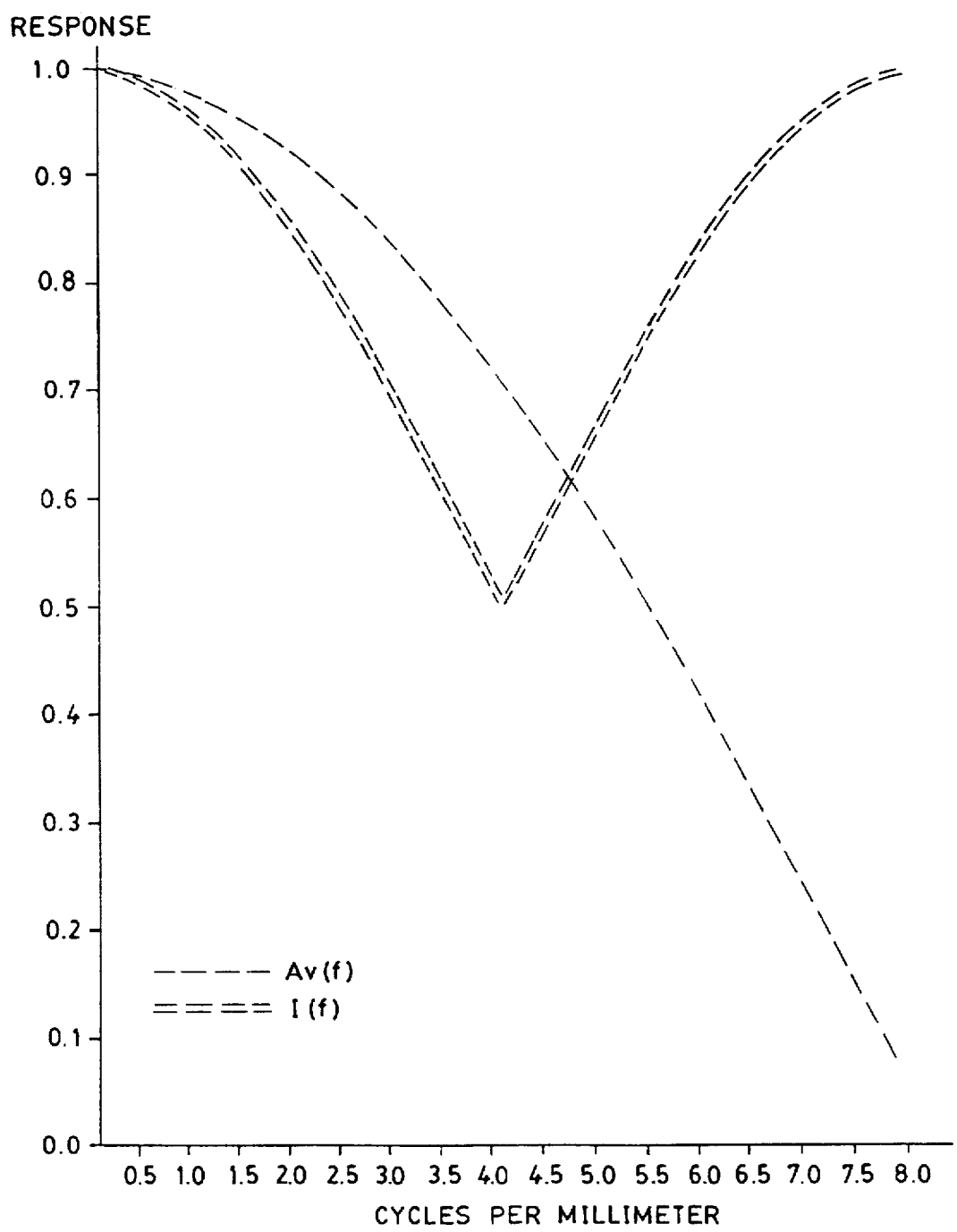
FIG. 9 shows a characterization of the frequency response of the image processing associated with forming square pixels from rectangular pixels.

FIG. 9 shows the frequency responses of horizontal averaging and vertical interpolation for representative geometries of M=10, p=0.006 mm. for horizontal averaging, and p=0.012 mm. for vertical interpolation. The representative frequency responses are given by the following equations:

$$Av(f) = \cos(\pi \times f \times M \times p)$$

$$I(f) = 0.5 + \cos(\pi \times f \times M \times p)/2$$

Where Av(f), the horizontal averaging frequency response, is the Fourier transform of two delta functions scaled to 0.5 area spaced one pixel apart in the sensor plane. This models the frequency response of the pairwise averaging process. The model of linear interpolation for a fixed upsampling factor of two is given by one half of the transform of a unit delta function centered at the origin since every other line of data is untouched, plus one half of the transform of a pair of scaled delta functions spaced one pixel apart at the sensor plane since each interpolated line is formed from equal parts of the neighboring lines. The associated frequency response for this representative interpolation is I(f).

Analysis of the frequency responses of the component parts of an electronic still camera allows invocation of the convenient property of characterization of a system by cascading the responses of the components frequency by frequency. That is, the net system response at a single frequency is given by multiplying the responses of the components each with the others at that frequency. This process is repeated for each frequency of interest.

To evaluate sharpness, the characteristics of the human visual system must be considered. Figures of sharpness merit for the frequency response of imaging systems are well known in the art. For instance, extensive work has been published on CMT acutance, AMT acutance, and SQF. A sharpness figure of merit is given below which is used in the representative example of FIG. 10.

$$S = 100 \times \left( \frac{\int_{f=0.5}^{2.0} \frac{R(f)}{f} df}{\int_{f=0.5}^{2.0} \frac{1}{f} df} \right)$$

where R(f) is the net system response, and f is in print refereed cycles per millimeter. The limits of integration in the figure of merit span the range of greatest visual sensitivity as shown in FIG. 7.

Figure 10:
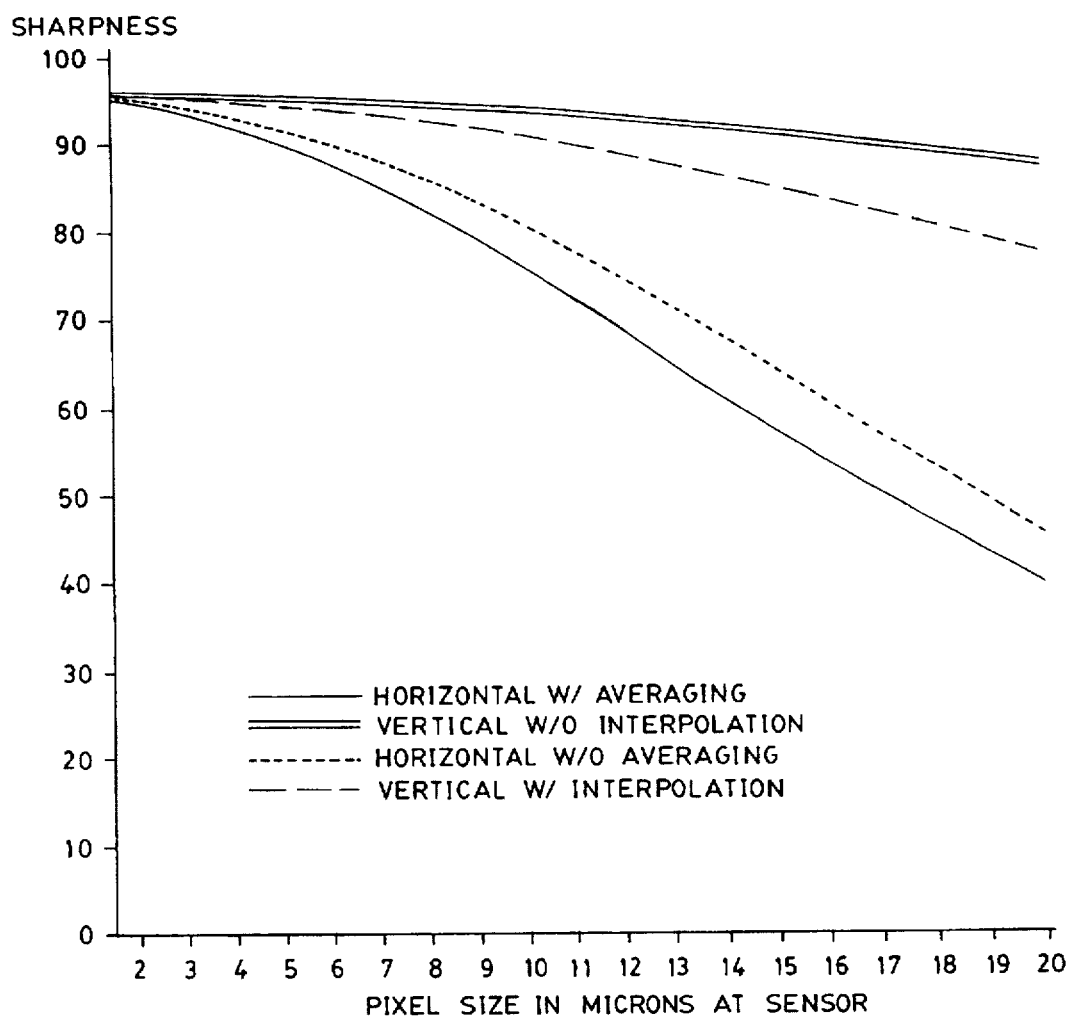
FIG. 10 shows a representative example of the relationship of a sharpness figure of merit to pixel geometry.

FIG. 10 shows the relationship between sharpness S in the horizontal and vertical directions for both resolution cases, and pixel geometry. It can be seen in FIG. 10, that in the preferred embodiment of RGB striped color filters with two spot anti-aliasing, median filter color recovery and dual resolution capability the sharpness in the horizontal and vertical directions is most closely balanced with rectangular pixels. Furthermore, it can be seen that balance is struck in the case of horizontal averaging at an aspect ratio slightly greater than 2:1, and in the case of vertical interpolation, at an aspect ratio slightly less than 2:1. In the preferred embodiment the aspect ratio of the sensor pixels is 2:1 such that balance is substantially achieved in each resolution mode.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

The embodiments of the invention in which an exclusive property or privilege is claimed are defined as follows:

1. A method of processing an original image captured by an image acquisition device with a two-dimensional matrix of non-square pixels having a first aspect ratio which define a normal resolution to form a processed image for rendering on an output device having a square raster having a second aspect ratio which differs from the first aspect ratio, the method comprising the steps of:

sampling the image in a color sub-sampled manner such that fewer than three color measurements are known for each pixel location; and constructing the processed image of the original image by processing the fewer than three color measurements known for each pixel to generate one or more interpolated color values at each of the pixel locations, the processed image being processed such that an aspect ratio of the original image captured on the non-square pixels is maintained on the output device.

2. The method according to claim 1 wherein the step of constructing the processed image comprises injecting lightness transitions sensed at each pixel location regardless of color to reconstruct missing color pixel values.

3. The method according to claim 1 wherein the non-square pixels have a substantially rectangular geometry and the method further comprises the step of interpolating at least one row of interpolated pixels for each of the plurality of color values from more than one row of the non-square pixels.

4. The method of claim 3 wherein the step of interpolating defines a high-resolution mode in the image acquisition device where the high-resolution mode defines an image with more pixels than the normal resolution.

5. The method according to claim 3 wherein the step of interpolating defines a low-resolution mode in the image acquisition device where the low-resolution mode defines an image with fewer pixels than the normal resolution.

6. An electronic still camera having an optical system disposed therein for photographing a subject, the electronic still camera comprising a sensor disposed within the optical system in optical alignment with the subject such that actuation of the sensor causes the sensor to electronically capture an image of the subject, the sensor being arranged with a two-dimensional matrix of pixels oriented in substantially parallel vertical columns where each of the substantially parallel vertical columns is overlaid with a color filter to define a blur function in the electronic still camera where a pixel geometry of the pixels in the sensor is defined by an optimum sharpness in each sampling direction given the blur function such that the optical system is optimized to balance sharpness in each of two sampling directions.

7. A method of imaging a raster of non-square pixels onto a display having square pixels, the method comprising the steps of:

calculating the raster of non-square pixels thus generating consecutive rows of non-square pixels;

creating an interpolated row between each of the consecutive rows of non-square pixels which carries color information that makes a transition between the non-square pixels;

interposing the interpolated row between each of the consecutive rows of non-square pixels to create a modified raster; and transmitting the modified raster to the display.

8. The method according to claim 7 wherein the step of calculating the raster comprises injecting lightness transitions sensed by each non-square pixel regardless of color to reconstruct missing color pixel values.

9. A method of imaging a scene captured by an image sensor having a raster of non-square pixels with a first aspect ratio onto an output device having a square raster with a second aspect ratio where the second aspect ration is differs from the first aspect ratio, the method comprising the steps of:

interpolating a plurality of interpolated rows from the raster of non-square pixels;

injecting the plurality of interpolated rows into the raster of non-square pixels to create a modified raster having the second aspect ratio; and transmitting the modified raster to the output device.

10. The method according to claim 9 wherein the step of interpolating the plurality of interpolated rows comprises injecting lightness transitions sensed by each non-square pixel regardless of color to reconstruct missing color pixel values.

11. An image acquisition device for capturing a color image comprising:

a sensor segmented into a two-dimensional matrix of rectangular light wells, where each of the light wells has a length that exceeds a width and is adapted to capture light for a single spatial location;

color filter stripes vertically disposed on the sensor oriented along the length of the rectangular light wells such that each column of rectangular light wells collects a single color of light; and an anti-aliasing filter disposed in optical alignment with the sensor for introducing a unidirectional blur into the light where the direction of the blur is substantially orthogonal to the color filter stripes such that the blur is subdivided in the direction of the width of the rectangular light wells thereby reducing color artifacts.

12. The image acquisition device according to claim 11 further comprising a processor which interpolates missing color information for each of the rectangular light wells to generate color triplets at each spatial location.

* * * * *